Dec. 11, 1945.   W. U. WATSON   2,390,760
CLAMP SUPPORT FOR FLAG STAFFS
Filed June 7, 1943
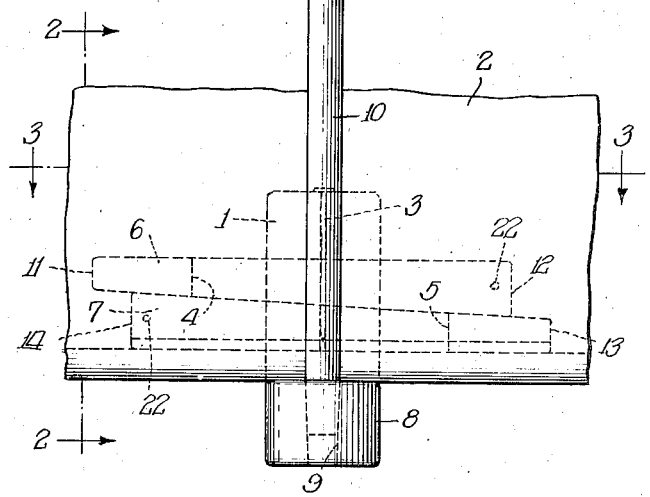
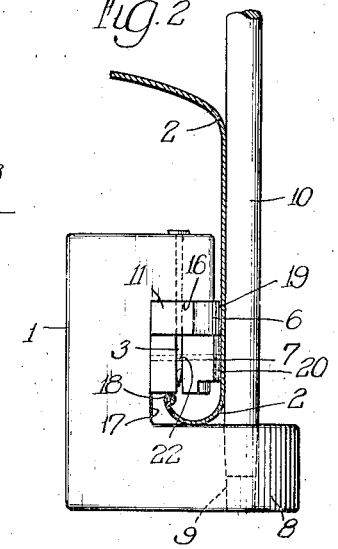
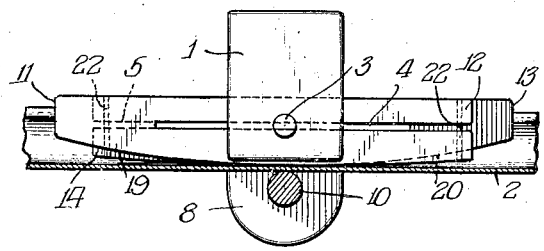
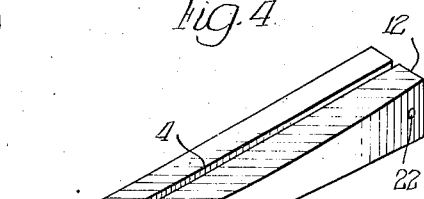
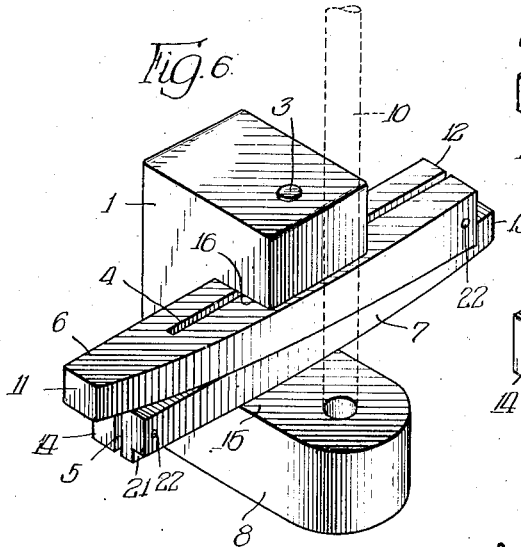
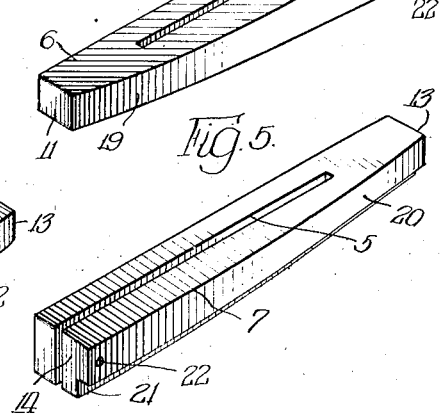
INVENTOR.
William U. Watson,
BY
Spencer, Marzall, Johnston & Cook
Attys.

Patented Dec. 11, 1945

2,390,760

UNITED STATES PATENT OFFICE 2,390,760

CLAMP SUPPORT FOR FLAGSTAFFS

William U. Watson, Chicago, Ill.

Application June 7, 1943, Serial No. 489,898

11 Claims. (Cl. 248—43)

This invention relates to a mounting for a pennant or flag staff or other article including a staff-like or rod-like supporting means, and more particularly to a clamp to be attached to the fender of an automobile or other vehicle for such purpose.

An object of this invention is to provide compact, simple and efficient means for quickly and securely clamping a staff of a pennant or flag in a convenient position, particularly on the fender of a motor vehicle, and in a manner so that it may be readily unclamped and demounted.

Other objects of this invention include the provision of novel wedging means of simple design for adjustably supporting and securing such an article in position, which can be made of generally available materials and readily and economically manufactured and assembled in position.

Additional objects, advantages and capabilities inherent in this invention will become readily apparent from the description thereof which follows.

This invention further resides in the combination, construction and arrangement of parts illustrated in the accompanying drawing, and while there is shown therein preferred embodiments of the invention, it is to be understood that the same are susceptible of modification and change without departing from the spirit of the invention.

The accompanying drawing illustrates a selected embodiment of the invention, and the views therein are as follows:

Fig. 1 is an end elevation of the invention in operative position on the fender of a motor vehicle;

Fig. 2 is a sectional view along the line 2—2 of Fig. 1;

Fig. 3 is a plan view of the device shown in Fig. 1, partially in section;

Fig. 4 is a perspective view of a part of the device shown in Figs. 1, 2 and 3;

Fig. 5 is a perspective view of another part of the device shown in Figs. 1, 2 and 3;

Fig. 6 is a perspective view of the parts of the device shown in Fig. 1 in assembled position but detached from the fender.

The particular device herein disclosed for the purpose of illustrating the invention comprises a block 1 of generally U-shape but having one arm or leg shorter than the other. This block may consist of a single piece of material or a plurality of pieces glued or otherwise suitably secured together. It may be made of any suitable material such as wood, metal, plastic or other material. It is arranged and conformed so as to receive a portion of the fender 2 of an automobile or other object in the manner best shown in Fig. 2 of the drawing. A nail or pin 3, arranged in spaced relation generally as shown in Figs. 1, 2 and 3, pierces the upper arm of the block 1 and extends downwardly into the cut-out portion or bight thereof. This pin provides a guide for slotted portions 4 and 5 of wedge members 6 and 7. The wedges 6 and 7 are tapered on two surfaces at right angles to each other, as shown in Figs. 3, 4, 5 and 6, the ends 11 and 13 being respectively of smaller dimensions in two directions than the ends 12 and 14.

The lower arm or base 8 of the block 1 is provided with a tapered hole 9 adapted to receive one end of a staff 10 of a pennant, flag or other article, which also may be tapered. The longitudinal axis of the hole 9 extends in a plane spaced generally from the projecting end of the upper or shorter arm of the block 1.

The invention operates in the following manner: The block 1 with pin 3 in place is arranged in operative position adjacent an edge of a fender of a motor vehicle, as shown in Fig. 2. One end of a staff 10 of a pennant or flag is pressed into the tapered opening or hole 9. The wedges 6 and 7 are then placed in position in the cut-out portion of the block 1 astride the pin 3, with their tapered ends 11 and 13 in opposed relation and a tapered surface of one wedge abutting a tapered surface of the other wedge, as shown in Figs. 1 and 6. The other tapered surface of the wedges is arranged against the inner surface of the fender, as shown in Figs. 2 and 3. Pressure is then exerted on the larger end of each wedge to slide the wedges along their abutting surfaces into tightly wedging relation between the surface 16 of the block 1 and the edge or bead 18 of the fender, whose lowermost portion abuts the surface 15 of the block 1, and between the surface 17 of the block and the inner surface of the fender, as shown in Figs. 2 and 3. The opening or hole 9 and the staff 10 therein are preferably positioned so that the wedging action thus caused will press the outer surface of the fender against the staff to maintain the staff tightly seated in the hole 9.

The surface of the wedges abutting the inner surface of the fender or other support may be gently curved, as illustrated at 19 and 20 in Fig. 3, to distinguish from the other tapered surface and to facilitate assembly and disassembly of the parts.

The lower wedge 7 may be provided with a groove 21 adapted to receive an edge or bead of a fender or other support in some forms (not shown). A transversely extending pin 22 is provided in each of the wedge members to prevent removal thereof from the guide member 3.

Changes may be made in the form, construction and arrangement of the parts without departing from the spirit of the invention, and the right is hereby reserved to make all such changes as fairly fall within the scope of the following claims.

The invention is hereby claimed as follows:

1. A clamp for mounting a flag staff on a support comprising a generally rectangular body member, said member having a bight therein adapted to receive a portion of said support and opposed arms adjacent said bight, a guide member mounted in one of said arms and extending into said bight, an opening in the other of said arms and arranged in spaced relation with said guide member for receiving a flag staff, and complementary wedge members arranged in said bight in cooperative relation with said guide member and adjacent surfaces of said body member and said support.

2. A clamp for mounting a flag staff on a support comprising a generally rectangular body member, said member having a bight therein adapted to receive a portion of said support and opposed arms adjacent said bight, one of said arms being longer than the other, a guide member mounted in the shorter of said arms and extending into said bight, an opening in the other of said arms and arranged in spaced relation with said guide member for receiving a flag staff and complementary wedge members arranged in said bight in cooperative relation with said guide member and adjacent surfaces of said body member and said support, each of said wedge members being tapered in two directions generally perpendicular to each other.

3. A clamp for mounting a flag staff on a support comprising a generally rectangular body member, said member having a bight therein adapted to receive a portion of said support and opposed arms adjacent said bight, one of said arms being longer than the other, a guide member mounted in the shorter of said arms and extending into said bight, an opening in the other of said arms and arranged in spaced relation with said guide member for receiving a flag staff, and complementary wedge members arranged in said bight in cooperative relation with said guide member and adjacent surfaces of said body member and said support, each of said wedge members being tapered in two directions generally perpendicular to each other and one of said wedge members having a groove adapted to receive a portion of said support.

4. A clamp for supporting a flag staff on a fender of a motor vehicle comprising a generally rectangular body member, said member having a generally rectangular bight therein adapted to receive a portion of said fender and opposed arms adjacent said bight, one of said arms being longer than the other, a guide pin mounted in the shorter of said arms and extending into said bight, an opening in the other of said arms arranged in spaced relation with said guide pin for receiving a flag staff, and complementary wedge members arranged in said bight in cooperative relation with said guide member and adjacent surfaces of said body member and said fender, each of said wedge members being provided with a slotted way adapted to receive said guide pin.

5. A clamp support for a flag staff comprising a generally rectangular supporting member having on one side thereof a pair of spaced arms, one of said arms being longer than the other, a tapered opening in the longer arm and arranged to receive a staff having a longitudinal axis in common with the longitudinal axis of said opening and extending in a direction generally normal to the plane of a surface of the shorter arm, a guide pin mounted in the shorter arm in spaced relation with said axis and extending into the space between said arms, and complementary wedge members adapted to be arranged in the space between said arms and in cooperative relation with said guide pin and adjacent surfaces of said supporting member to exert a clamping action upon portions of an article interposed between said wedge members and said staff and between a surface of one of said wedge members and an adjacent surface of the longer of said arms.

6. A device of the character described comprising a support, a generally U-shaped supporting member adapted to be mounted on said support and having opposed legs, one of which is longer than the other, an opening in the longer leg adapted to receive one end of a staff, a staff mounted in said opening, a guide mounted in the shorter leg, and wedging members arranged between said legs in cooperative relation with said guide and said support, the parts being so conformed and arranged that pressure may be exerted upon opposed ends of said wedging members to cause a wedging action between the parts and thereby secure said supporting member to said support and maintain said staff in position in said opening.

7. A clamp support for a flagstaff as set forth in claim 4 in which the wedge members are provided with a stop extending transversely of the slotted way therein to prevent their withdrawal from cooperative relation with the guide pin.

8. A device for supporting a staff or similar article on a supporting member such as an automobile fender and comprising a body adapted to receive a part of the supporting member, and a slidable wedge adapted for wedging action with the body to clamp the body to the supporting member, said body having means to support a staff.

9. A device for supporting a staff or similar article on a supporting member such as an automobile fender and comprising a body, said body having a receiving opening into which a part of the supporting member is adapted to be received, and a pair of wedges slidable in the opening and engageable with the body and member to clamp the body to the member.

10. A device for supporting a staff or similar article on a supporting member such as an automobile fender and comprising a body, said body having a receiving opening into which a part of the supporting member is adapted to be received, a pair of wedges slidable in the opening and engageable with the body and member to clamp the body to the member, and means slidingly holding the wedges to the body.

11. A device for supporting a staff or similar article on a supporting member such as an automobile fender and comprising a body, said body having a receiving opening into which a part of the supporting member is adapted to be received, a pair of wedges slidable in the opening and engageable with the body and member to clamp the body to the member, and means slidingly holding the wedges to the body, said means including alined slots in the wedges and a holding pin in the body engaging the slots.

WILLIAM U. WATSON.